(No Model.) 2 Sheets—Sheet 1.
J. W. ROSS.
CLUTCH FOR CONVERTING MOTION.
No. 249,485. Patented Nov. 15, 1881.
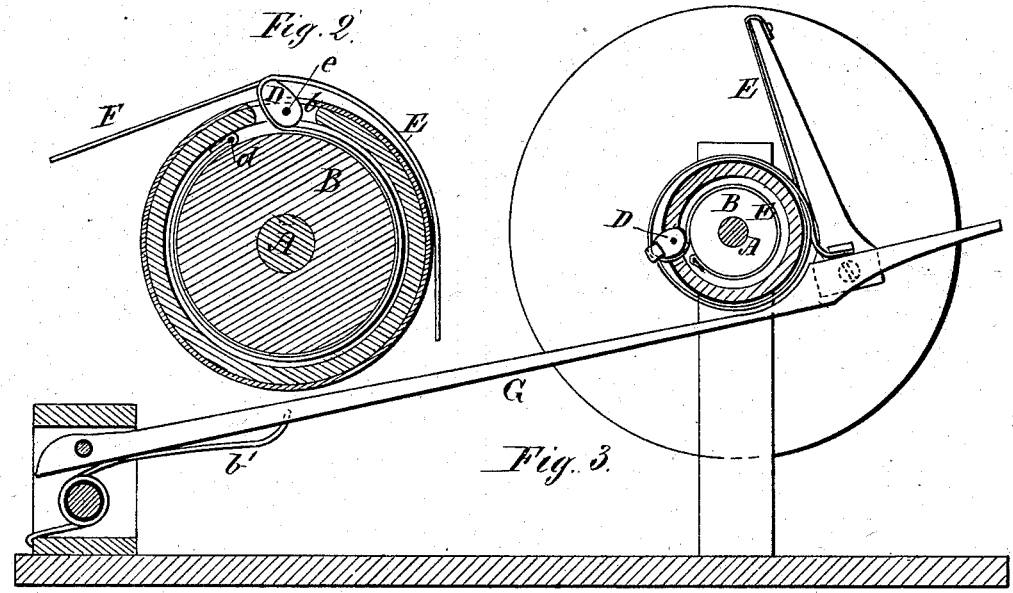
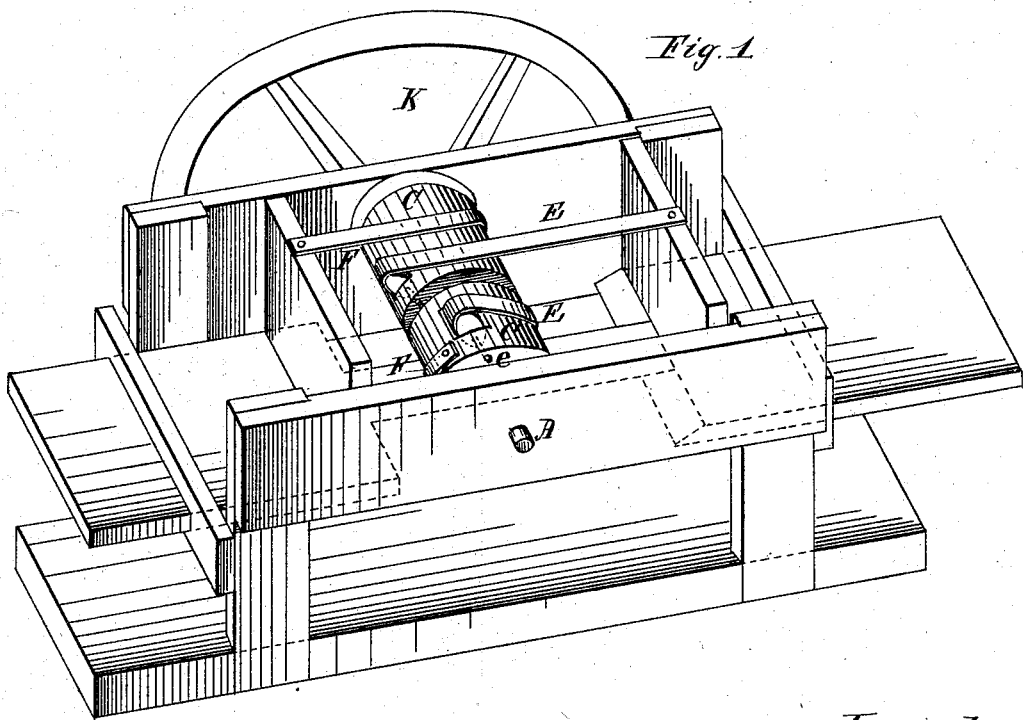
Witnesses
Wm. A. McElwee
Henry Orth
Inventor
John W. Ross
By W. Burris
Atty.

(No Model.) 2 Sheets—Sheet 2.
J. W. ROSS.
CLUTCH FOR CONVERTING MOTION.
No. 249,485. Patented Nov. 15, 1881.
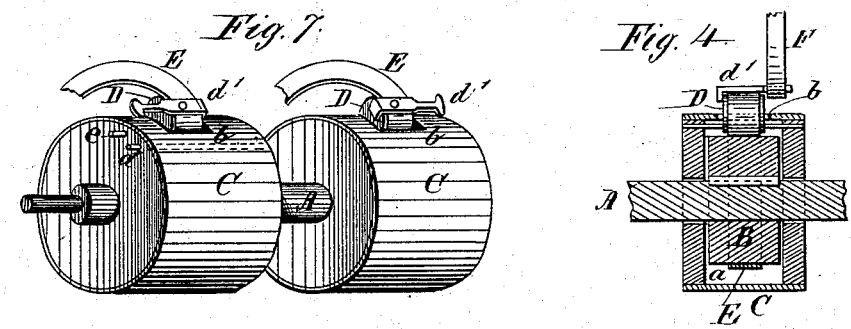
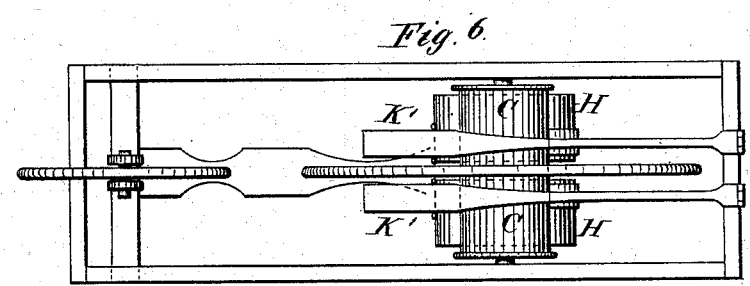
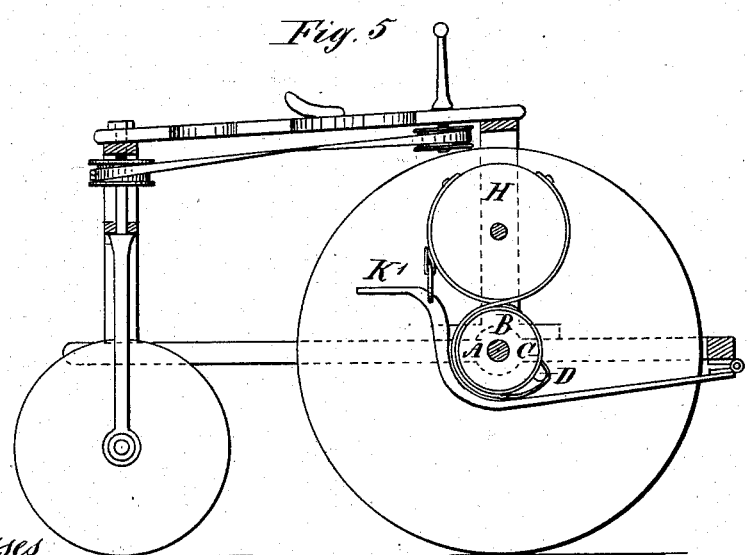
Witnesses
Wm. A. McElwee.
Henry Orb
Inventor.
John W. Ross
By W. T. Burris
Atty.

UNITED STATES PATENT OFFICE.

JOHN W. ROSS, OF SANTA CLARA, CALIFORNIA.

CLUTCH FOR CONVERTING MOTION.

SPECIFICATION forming part of Letters Patent No. 249,485, dated November 15, 1881.

Application filed May 6, 1881. (No model.)

*To all whom it may concern:*

Be it known that I, JOHN W. ROSS, of Santa Clara, in the county of Santa Clara and State of California, have invented certain new and useful Improvements in Clutches for Converting Direct or Rectilinear to Rotary Motion; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in clutch devices for converting rectilinear, reciprocating, or other equivalent motions into rotary motions without the use of cranks; and the invention consists of a clutch produced by a band extended around, and adjusted to be tightened on and loosened from a rotating shaft, or a fixed pulley on a rotating shaft, so as to rotate the shaft by means of a treadle, lever, or other propelling device to which the strap may be attached, as hereinafter fully described, and as illustrated by the drawings, in which—

Figure 1 is a perspective view, illustrating the application of the improved clutch to a pulley-shaft. Fig. 2 is a transverse section of the sleeve, eccentric, and shaft, showing the fixed pulley in elevation in the chamber of the sleeve. Fig. 3 is a side elevation, showing the application of the clutch to the treadle or lever movement. Fig. 4 is a longitudinal section through the sleeve, pulley, and shaft. Fig. 5 is a side elevation, showing the application of the clutch to a velocipede. Fig. 6 is a bottom view of the velocipede shown in Fig. 5. Fig. 7 is a perspective view of the double clutch detached.

My improved clutch may be employed wherever it may be desirable to convert rectilinear, reciprocating, or any other equivalent motion into rotary motion—as, for example, to run velocipedes, turning-lathes, grindstones, and sewing-machines by a treadle or lever or by a reciprocating engine.

In the drawings, A designates a rotating shaft.

B is a fixed pulley upon the shaft at the point where the power is to be applied.

C is a sleeve or drum adjusted loosely upon the shaft, and is provided with a chamber, $a$, to receive the pulley, and with a slot, $b$, on one side, to receive the roller or eccentric D, which is adjusted upon a bolt, $e$, extended through the ends of the sleeve.

A cam or a lever may be employed instead of a roller or eccentric.

E is a strap, secured at one end to the sleeve C by a bolt, $d$, extended through the ends of the sleeve. This strap extends entirely around the pulley B, inside of the sleeve, and out through the slot and around the eccentric, to which it is attached, and then it is extended in a reverse direction over and around the sleeve to any desired distance not exceeding three-fourths of its circumference, and then off at a tangent from the sleeve, to be connected with a treadle, lever, reciprocating shaft, or other propelling device, as shown in the drawings.

F is a strap, connected at one end to the sleeve, or, preferably, to an arm, $d'$, on the eccentric, and is extended partly around the sleeve in a direction opposite to the direction of the strap E, and the other end of this strap may be connected with the actuating treadle or lever G, provided with a spring, $b'$, for imparting reverse motion to the lever. When the clutch is actuated by a reciprocating shaft or plate the strap F may be attached to the end opposite to the end to which strap E is attached. It is preferable to attach one end of this returning strap to the eccentric rather than to the sleeve, because, when attached to the eccentric, it tends to reverse the position of the eccentric at the end of the stroke, and thus to aid in a complete and prompt release of the clutch of the strap from the pulley, allowing the free continuous rotary motion of the shaft.

If the power is applied only in one direction, as when a treadle or lever is used, a balance-wheel, K, may be employed to continue the momentum of the shaft while the sleeve is returning for another stroke. If the power is applied in two directions, as shown in Fig. 1, two of the clutching devices may be used, each provided with its propelling and returning straps, operating in opposite directions, so that the alternate strokes will produce a continuous uniform movement of the shaft.

The power and speed of a machine to which my improved clutch may be applied depend upon the size of the fixed pulley. The larger the pulley the greater the power, and the smaller the pulley the greater the speed; and by increasing the length of the face of the pulley, and correspondingly the width of the strap, or by corrugating the surface of the pulley, the clutching-power of the strap may be increased to any required extent. Power being applied to the strap E, the eccentric D is caused to act as a lever upon the strap, drawing it closely and tightly around, and thus clutching the pulley, causing it and the sleeve to turn together as far as the stroke of the actuating lever or shaft will carry them, and giving thus the shaft a rotary motion; and as soon as the pressure of the propelling-power upon the strap E ceases the clutch of the strap will be released from the pulley, allowing the shaft to continue its free rotary motion by the momentum given to it, while by means of the returning-strap F and spring $b'$ the sleeve C and strap E are returned to their former position, ready for another stroke.

In the application of the invention to a velocipede two clutching devices are employed, as shown in Figs. 5 and 6 of the drawings. In this case the propelling-straps E are extended from the eccentrics over the top to the front of the rollers H, which are adjusted above the sleeves C, and continuations of these straps or other independent straps are secured to the outside of these rollers, and extending down behind the rollers are connected with the driving treadles or levers K K.

Each of the rollers H is provided with a spring for reversing the motion of the sleeves and treadles. By this construction and arrangement of the devices the wheels of the vehicle may be driven by treadles or levers in the rear of the driving shaft or axle, and the propelling-straps are connected directly with the front of the sleeves, and the propelling power is applied by the feet vertically instead of by a circular motion, as with the ordinary crank movement.

What I claim as new, and desire to secure by Letters Patent, is—

1. A clutching device consisting of a band or strap arranged around a shaft or a fixed hub or pulley on a shaft, the band or strap being adjusted to be tightened upon the shaft or fixed pulley forming the clutch, and the band or strap being connected with devices adjusted to release the clutch of the band or strap, allowing free motion to the shaft, thus imparting continuous rotary motion to the shaft by mechanism substantially as and for the purposes described.

2. The combination, with the shaft A, provided with the fixed pulley B, of the sleeve or drum C, adjusted loosely upon the shaft, and provided with a chamber, $a$, to receive the pulley, and with the slot $b$, to receive the eccentric or cam D, substantially as and for the purposes described.

3. The combination, with the shaft A, having the fixed pulley B, the chambered sleeve C, and the eccentric or cam D, of the strap E, extended around the pulley over the eccentric, and connected with the actuating mechanism, substantially as and for the purposes described.

4. The combination, with the shaft A, having the fixed pulley B, chambered sleeve C, eccentric D, and strap E, of the strap F, connected at one end with the sleeve or with the eccentric, and extended around the sleeve in a direction the reverse to the direction of the strap E, and connected with the actuating mechanism, substantially as and for the purposes described.

In testimony that I claim the foregoing as my own invention I affix my signature in presence of two witnesses.

JOHN W. ROSS.

Witnesses:
F. M. GREEN,
WM. N. ROWE.